Patented July 25, 1950

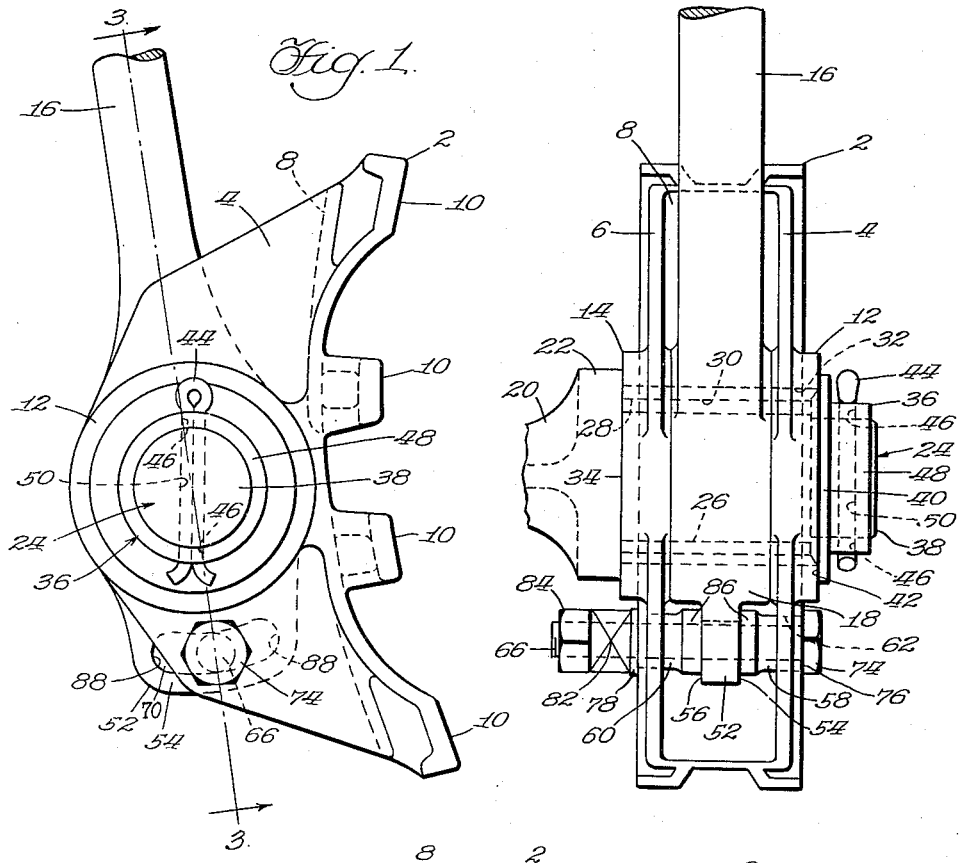

2,516,696

UNITED STATES PATENT OFFICE 2,516,696

BRAKE HEAD BALANCING DEVICE

Lawrence Gothberg, Chicago, Ill., assignor to American Steel Foundries, Chicago, Ill., a corporation of New Jersey Application May 4, 1948, Serial No. 24,967

7 Claims. (Cl. 188—207)

This invention relates to railway brake equipment and more particularly to a novel form of balancing device arranged for association with a brake head and its supporting hanger in such manner as to afford constant concentricity of the brake shoe with respect to the tread of an associated wheel.

One object of the invention is to provide an automatic brake head balancing device operable between the brake head and hanger.

Another object of the invention is to provide a novel brake head balancing device which is simple, of rugged construction, efficient in use, and easy to apply and maintain.

A further object of the invention is to provide a balancing device which may be applied to brake heads of standard design now in use by slightly modifying these heads.

The invention contemplates an arrangement wherein friction means are arranged to control pivoting of the brake head and also connect the brake head to the hanger to afford support for the brake head in the event of failure of the beam.

These and other objects of the invention will become more apparent from the specification and the drawings, wherein:

Figure 1 is a side elevation of a brake mechanism embodying my invention;

Figure 2 is a view in end elevation of the structure shown in Figure 1; and

Figure 3 is a sectional view taken substantially on the line 3—3 of Figure 1.

Describing the invention in detail, the brake head, generally designated 2, comprises spaced side walls 4 and 6 and a transverse wall 8 interconnecting said side walls and provided with spaced lugs 10, 10 for supporting an associated brake shoe (not shown). The side walls 4 and 6 are provided with parallel bearing portions 12 and 14, respectively.

Between the brake head walls 4 and 6 is positioned a hanger 16 having a bearing portion 18 at its lower end interposed between bearing portions 12 and 14. The upper end of the hanger (not shown) is adapted to be pivotally connected in the usual manner to an associated support structure such as a truck frame (not shown), as will be readily understood by those skilled in the art.

A brake beam 20 is associated with the head and hanger and is formed with a shoulder or collar 22 and a journal end portion in the form of a trunnion 24 with a bushing 26 press-fitted thereon. The trunnion 24 with bushing 26 extends through a bushed opening 28 in bearing 14, through a bushed opening 30 in the hanger bearing portion 18, and through a bushed opening 32 in bearing portion 12. The bearing 14 on the inboard side of the head is fitted against the shoulder 22 as at 34.

At the outboard side of the brake head is positioned a sleeve washer or retaining member 36 sleeved onto a reduced outer end portion 38 of the trunnion 24. The sleeve washer has an outturned flange 40 in abutment with the outer side of bearing 12 as at 42. The flange washer is secured to the portion 38 of trunnion 24 by means of a key 44 extending through openings 46, 46 in the sleeve 48 of the washer 36, a transaxial opening 50 in the reduced portion 38 of trunnion 24. The head and hanger are thus pivotally locked on the trunnion 24 of the brake beam 20 by means of the shoulder 22 at the inboard side of the head and the washer 36 at the outboard side of the head.

To control and limit pivotal movement of the brake head on the brake beam and maintain the head in proper relation to the braking surface of an associated wheel, the lower extremity or bearing portion 18 of the hanger is provided with an outwardly extending friction tongue 52 which is disposed in the plane of the hanger 16 between and parallel to walls 4 and 6 of the brake head adjacent the lower ends thereof. The tongue 52 presents flat friction surfaces 54 and 56 at opposite sides thereof, friction surface 54 facing wall 4 and the friction surface 56 facing wall 6. Identical friction elements 58 and 60 are disposed against opposite sides of the tongue 52 against surfaces 54 and 56, respectively. Each friction element 58 and 60 is of generally tubular form, and it will be observed that elements 58 and 60 are disposed in alignment with each other transversely of the brake head and of tongue 52 and that friction element 58 projects at an end remote from the tongue through a complementary opening 62 in wall 4 and that the element 60 similarly extends through a complementary opening 64 in wall 6 of the brake head. Thus elements 58 and 60 are movable with the brake head upon rotation thereof and are slidable within openings 62 and 64 transversely of the brake head toward and away from friction tongue 52. A bolt 66, extending transversely of the brake head parallel to trunnion 24, projects through an opening 68 in the friction element 58, through a slot 70 in the friction tongue 52, and through an opening 72 in friction member 60. The bolt is provided with a head 74 at one end in abutment as at 76 with the adjacent or outer end of element 58 and at the opposite end of the bolt is positioned a washer 78 in abutment as at 80 with the outer end of friction member 60. Sleeved over the same end of the bolt is a spring 82 diagrammatically illustrated in Figure 2, and threaded on the same end of the bolt is a nut 84. The nut bears against one end of the spring 82 and the other end of the spring bears against washer 78. The washer 78 may, of course, be eliminated and the spring 82 may bear against the outer end of member 60. It will be noted that as the nut 84 is threaded onto the bolt 66, the spring 82 is compressed, thus drawing the head 74 of the bolt against member 58 which is urged against surface 54 of tongue 52, and simultaneously the spring 82, reacting through washer 78, urges member 60 against surface 56 on the friction tongue 52. The outer ends of members 58 and 60 protrude outwardly of the respective walls 4 and 6. It will be appreciated that substantially equal pressures are applied against opposite sides of the friction tongue 52 so that there is no tendency to tilt the hanger or the brake head on the trunnion 24. Each member 58 and 60 is formed at its inner end with an outturned flange portion 86 to provide large bearing areas against surfaces 54 and 56, these flanges 86, 86 also serving, in the event of failure of bolt 66, to prevent members 58 and 60 from falling out of openings 62 and 64, respectively, through abutment with walls 4 and 6, respectively.

The slot 70 in tongue 52 is of arcuate form and concentric to the axis of the trunnion 24. The portions of the tongue 52 at opposite ends of the slot provide abutments as at 88, 88 for abutment with the pin or bolt 66 to limit the rotation of the brake head.

In assembling the brake arrangement heretofore described, the friction elements 58 and 60 are inserted into openings 62 and 64, respectively, in walls 4 and 6 from the inner sides of said walls. The hanger 16 is then positioned between walls 4 and 6 with the friction tongue 52 thereon between the friction elements 58 and 60. The bolt 66 is then inserted through opening 68 in member 58, slot 70 in tongue 52, opening 72 in member 60, and is moved through these openings and slot until the bolt head 74 bears as at 76 against the member 58. On the threaded end of the bolt is positioned the washer 78 in abutment with member 60. Thereafter, spring 82 is positioned on the bolt against washer 78 and nut 84 is threaded onto the bolt against spring 82 and is tightened until members 58 and 60 are brought into tight engagement with surfaces 54 and 56, respectively. The assembly thus far described is then mounted on the brake beam 20 by inserting the trunnion 24 with bushing 26 thereon through openings 28, 30 and 32 in bearing portions 14, 18 and 12, bringing shoulder 22 against bearing portion 14. Washer 36 is then sleeved onto portion 38 of trunnion 24 with the outturned flange 40 of the washer engaging the bearing portion 12. The key 44 is then inserted through aligned openings 46 and 50 in sleeve 48 of washer 36 and portion 38 of trunnion 24, thus completing the assembly of the brake.

I claim:

1. In a brake arrangement, a brake head having spaced substantially parallel walls, a hanger extending between said walls, a pivot element extending through aligned openings in said walls and hanger, a friction element at one end of said hanger between said walls substantially parallel thereto, a friction member against each side of said friction element, each friction member being fitted in a complementary transverse opening in the adjacent wall and being slidable therein toward said friction element, a bolt extending through aligned openings in said friction members and said friction element, the opening in said friction element being arranged to accommodate pivotal movement between said head and hanger on said pivot element, abutment means on said bolt outwardly of said friction members, one of said abutment means engaging one of said members, and spring means compressed between the other of said abutment means and the other of said members.

2. In a brake head balancing device, a brake head including spaced walls, a hanger between said walls, a pivot element extending through said walls and hanger, a friction tongue on said hanger between said walls and having an arcuate slot therein concentric with said pivot element, a friction member mounted in each wall for movement with said head in accordance with the rotation thereof on said element relative to said hanger and slidable transversely of said walls toward said friction tongue, a bolt extending through said members and through the slot in said tongue, and resilient means on said bolt arranged to cooperate with said bolt to effect frictional engagement of said friction members with said tongue, said bolt being engageable with said tongue at the portions thereof defining the ends of said slot for limiting rotation of said head on said element relative to said hanger.

3. In a brake arrangement, a brake head having spaced walls, a support member including a tongue disposed between said walls, a pivot element extending through said walls and member affording a pivotal connection between said head and member, friction shoe means at opposite sides of said tongue extending through respective walls and in slidable engagement therewith for movement toward said tongue, and means including resilient means cooperatively arranged with said shoe means for urging the same against said tongue.

4. In a brake arrangement, a brake head member comprising spaced walls, a support member including an integral friction tongue extending between said walls, pivot means projecting through said walls and said support member affording a pivotal connection between said members, friction means carried by said head member in engagement with said tongue for resisting pivotal movement between said members, said friction means comprising a connecting element extending through openings in said walls and tongue, the opening in said tongue being formed and arranged to accommodate pivotal movement between said members, friction shoes carried by said element at opposite sides of said tongue, and means on said element cooperating with said shoes for urging the same against said tongue.

5. In a brake arrangement, a brake head including spaced walls, a hanger between said walls, pivot means extending through said walls and hanger, a friction tongue between said walls integral with said hanger, a shoe slidably carried by each wall within an opening therein, and means for urging the shoes against said tongue.

6. In a brake arrangement, brake head and support members, pivot means extending through said members affording a pivotal connection therebetween, a friction element integral with said support member, friction shoes disposed at opposite sides of said element in engagement therewith and extending through transverse openings in said head for slidable support thereby, and means for urging said shoes against said element and including stop means engageable with said element for limiting relative pivotal movement between said members.

7. In a brake arrangement, brake head and support members, means pivotally connecting the same, said support member comprising a friction element, said brake head member having spaced walls disposed at opposite sides of said element, and friction means for controlling pivotal movement between said members including a shoe at each side of said element in engagement therewith, each shoe extending through an opening in the adjacent wall, and means on each shoe between said element and the adjacent wall adapted for abutment with the latter to prevent removal of the shoe from the associated opening by movement of the shoe through the opening in a direction away from said element.

LAWRENCE GOTHBERG.

REFERENCES CITED

The following references are of record in the file of this patent:

UNITED STATES PATENTS

| Number | Name | Date |
|---|---|---|
| 1,643,837 | Christianson et al. | Sept. 27, 1927 |
| 2,130,595 | Mueller | Sept. 20, 1938 |